US011533236B2

(12) United States Patent
Xu et al.

(10) Patent No.: US 11,533,236 B2
(45) Date of Patent: Dec. 20, 2022

(54) CONFIGURATION FOR USER EQUIPMENT INTRA-FREQUENCY MEASUREMENT OF SOUNDING REFERENCE SIGNALS

(71) Applicant: QUALCOMM Incorporated, San Diego, CA (US)

(72) Inventors: Huilin Xu, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/166,769

(22) Filed: Feb. 3, 2021

(65) Prior Publication Data

US 2021/0306220 A1    Sep. 30, 2021

Related U.S. Application Data

(60) Provisional application No. 62/994,656, filed on Mar. 25, 2020.

(51) Int. Cl.
| | | |
|---|---|---|
| *H04L 41/0896* | (2022.01) | |
| *H04W 72/04* | (2009.01) | |
| *H04L 5/00* | (2006.01) | |
| *H04W 24/08* | (2009.01) | |

(52) U.S. Cl.
CPC ........ *H04L 41/0896* (2013.01); *H04L 5/0048* (2013.01); *H04W 24/08* (2013.01); *H04W 72/0453* (2013.01)

(58) Field of Classification Search
CPC .. H04L 41/0896; H04L 5/0048; H04W 24/08; H04W 72/0453
See application file for complete search history.

(56) References Cited

U.S. PATENT DOCUMENTS

| 2013/0170466 A1* | 7/2013 | Nishio | H04L 5/0053 |
| | | | 370/329 |
| 2019/0174446 A1* | 6/2019 | Zhang | H04W 92/045 |
| 2021/0006997 A1* | 1/2021 | Jin | H04B 17/345 |

OTHER PUBLICATIONS

International Search Report and Written Opinion—PCT/US2021/016643—ISA/EPO—dated Jun. 25, 2021.
Partial International Search Report—PCT/US2021/016643—ISA/EPO—dated May 3, 2021.

(Continued)

*Primary Examiner* — Duc C Ho
(74) *Attorney, Agent, or Firm* — Patterson+ Sheridan, L.L.P.

(57) ABSTRACT

Certain aspects of the present disclosure relate to wireless communications, and more particularly, to techniques for a UE to measure sounding reference signal (SRS) transmission from another UE. The measurements results may be used, for example, by a serving cell for interference mitigation purposes. For example, the disclosed techniques may include a first UE receiving a configuration for measuring SRS transmitted by a second UE; determining a first bandwidth part (BWP) associated with the configuration; determining a frequency reference point for the SRS to be measured; determining SRS measurement resources, based on one or more parameters of the configuration and the frequency reference point; and measuring SRS transmitted by the second UE on the determined SRS measurement resources.

30 Claims, 16 Drawing Sheets

(56) References Cited

OTHER PUBLICATIONS

Zte Corporation, et al., "Consdieration on CLI Remaining Issues", 3GPP TSG-RAN WG2 Meeting #107, 3GPP Draft, R2-1909798, Consideration on CLI Remaining Issues, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, 3 Pages, Aug. 15, 2019 (Aug. 15, 2019), XP051767593, Retrieved from the Internet: URL: http://www.3gpp.org/ftp/tsg_ran/WG2_RL2/TSGR2_107/Docs/R2-1909798.zip [retrieved on Aug. 15, 2019], paragraph [0002].

\* cited by examiner

CONFIGURATION FOR USER EQUIPMENT INTRA-FREQUENCY MEASUREMENT OF SOUNDING REFERENCE SIGNALS

CROSS-REFERENCE TO RELATED APPLICATION

This application claims benefit of and priority to U.S. Provisional Patent Application No. 62/994,656, filed Mar. 25, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for a UE to measure sounding reference signal (SRS) transmission from another UE.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a first user equipment (UE). The method generally includes receiving a configuration for measuring sounding reference signals (SRS) transmitted by a second UE; determining a first bandwidth part (BWP) associated with the configuration; determining a frequency reference point for the SRS to be measured; determining SRS measurement resources, based on one or more parameters of the configuration and the frequency reference point; and measuring SRS transmitted by the second UE on the determined SRS measurement resources.

Certain aspects of the disclosure relate to a method for wireless communication by a first UE. The method generally includes receiving a configuration of sounding reference signals (SRS) measurement resources for measuring SRS transmitted by a second UE; determining a maximum number of SRS measurement resources supported by the first UE based on a UE capability; and measuring SRS transmitted by the second UE based on the configuration and the determined maximum number of SRS measurement resources supported by the first UE.

Certain aspects of the disclosure relate to a method for wireless communication by a network entity. The method generally includes sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE on measurement resources determined based on a frequency reference point and one or more parameters of the configuration and the frequency reference point.

Certain aspects of the disclosure relate to a method for wireless communication by a network entity. The method generally includes sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE, subject to a maximum number of SRS measurement resources supported by the first UE based on a UE capability.

Aspects of the present disclosure also provide various apparatuses, means, and computer readable including instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
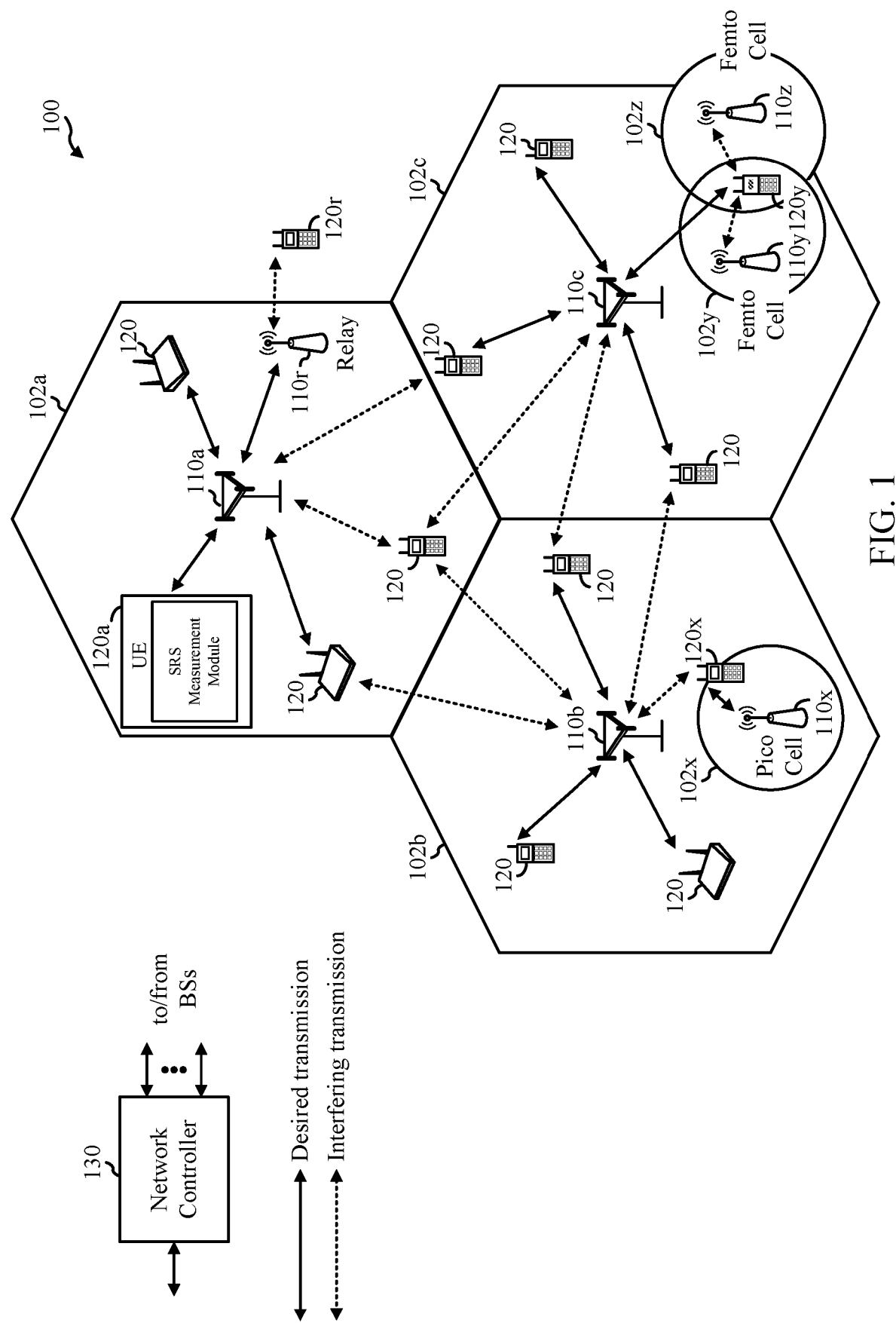
FIG. 1 is a block diagram conceptually illustrating an example telecommunications system, in accordance with certain aspects of the present disclosure.

Aspects of the present disclosure relate to wireless communications, and more particularly, to techniques for a UE to measure sounding reference signal (SRS) transmission from another UE. The measurements results may be used, for example, by a serving cell for interference mitigation purposes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include an SRS measurement module configured to perform (or assist the UE 120 in performing) operations 900 described below with reference to FIG. 9 and/or operations 1100 described below with reference to FIG. 11. Similarly, a base station 120 (e.g., a gNB) may include a UE SRS measurement module configured to perform (or assist the base station 120 in performing) operations 1000 described below with reference to FIG. 10 and/or operations 1200 described below with reference to FIG. 12.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
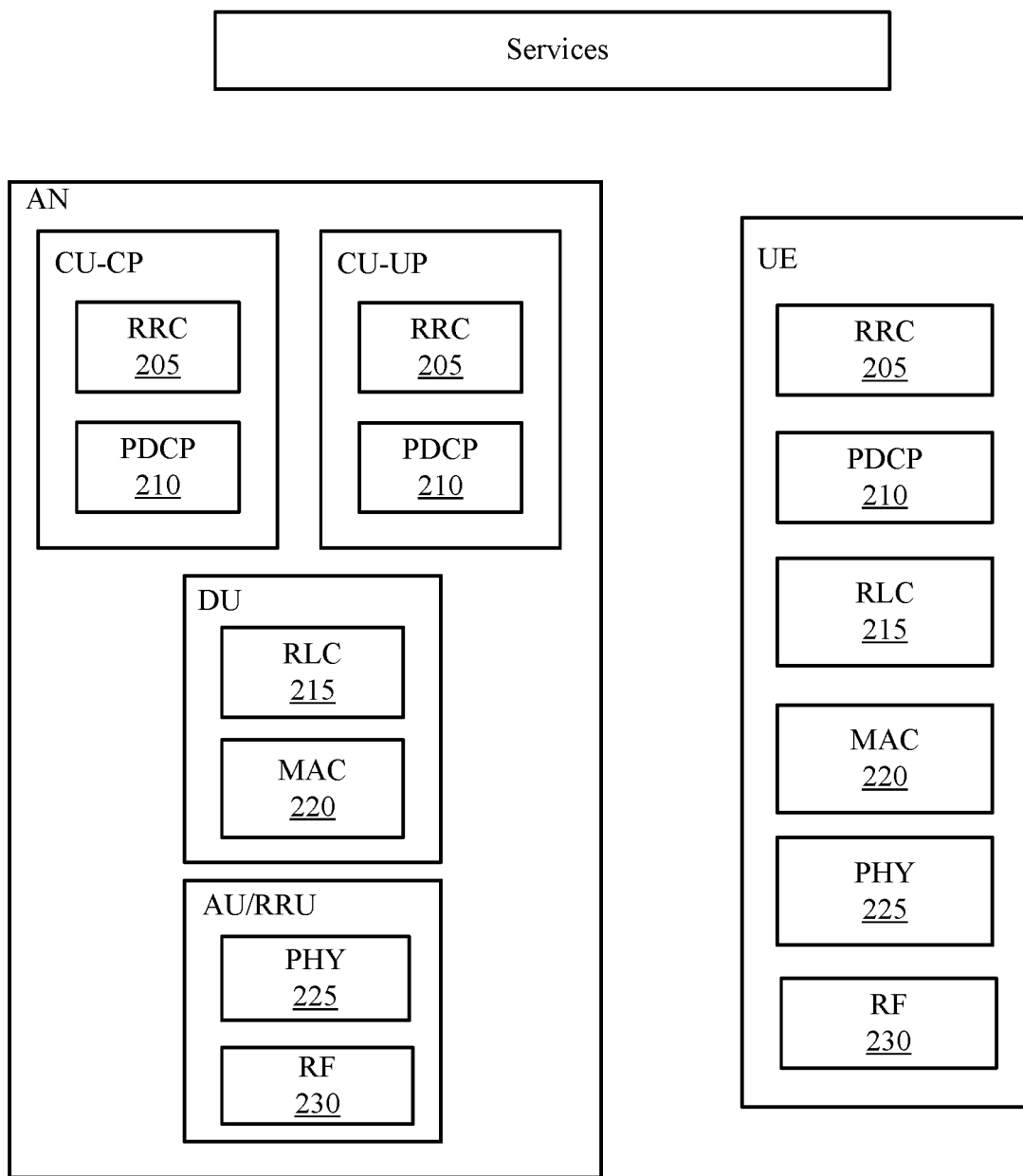
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer. The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
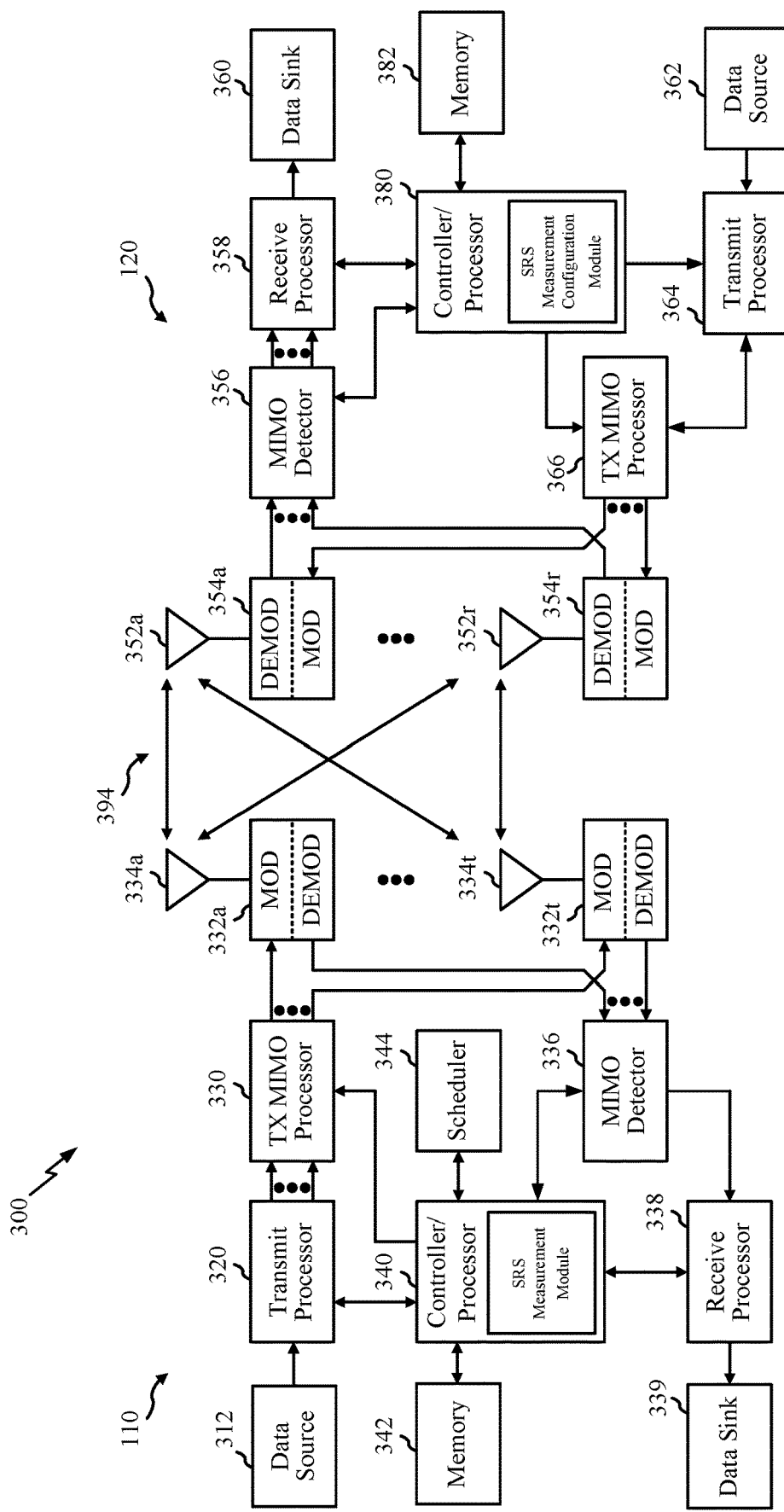
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 may be configured (or used) to perform operations 900 of FIG. 9 and/or operations 1100 of FIG. 11. Similarly, antennas 334, processors 320, 330, 338, and/or controller/processor 340 of the BS 110 may be configured (or used) to perform operations 1000 described below with reference to FIG. 10 and/or operations 1200 described below with reference to FIG. 12.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
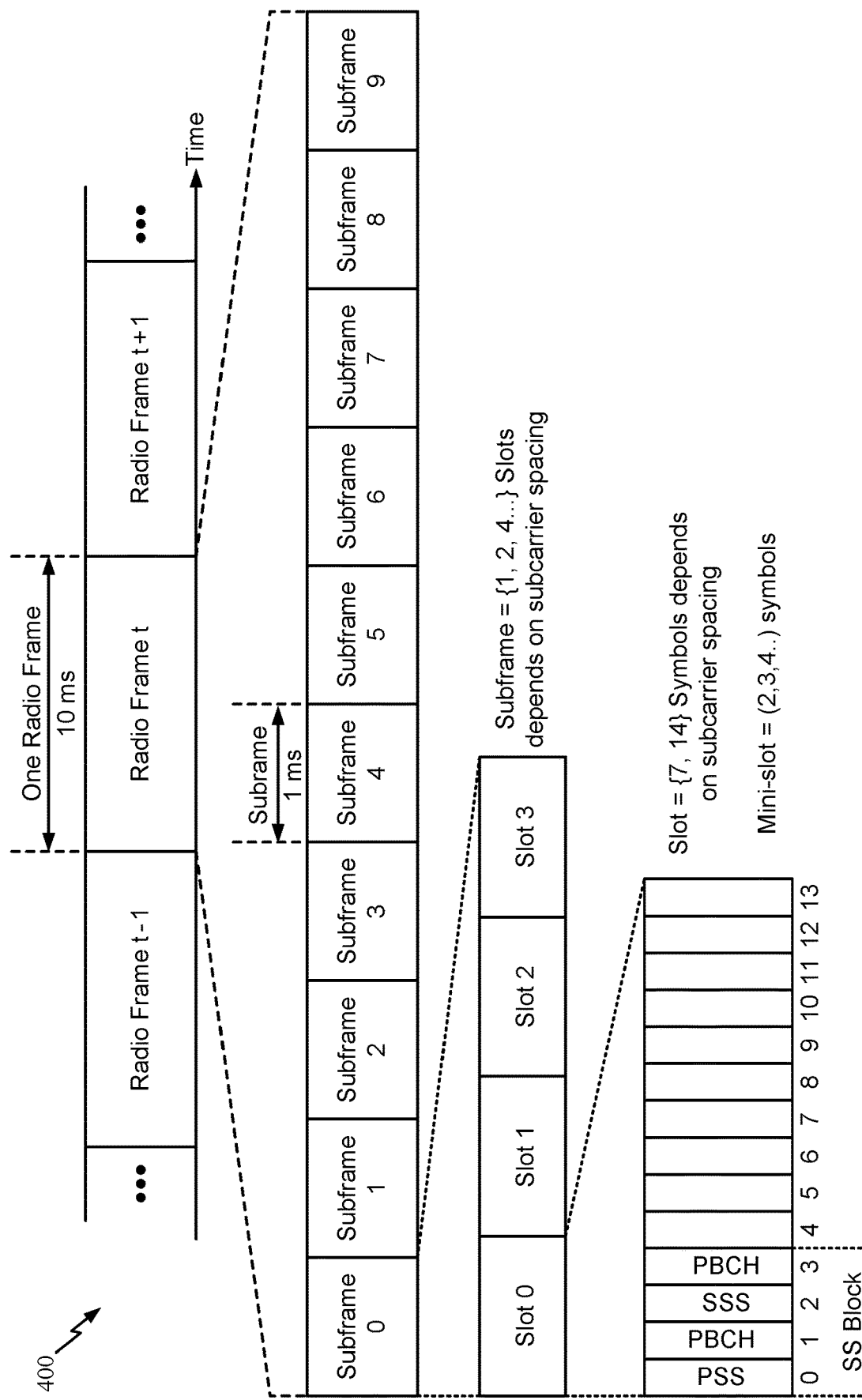
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Conventional SRS Use Cases

Figure 5:
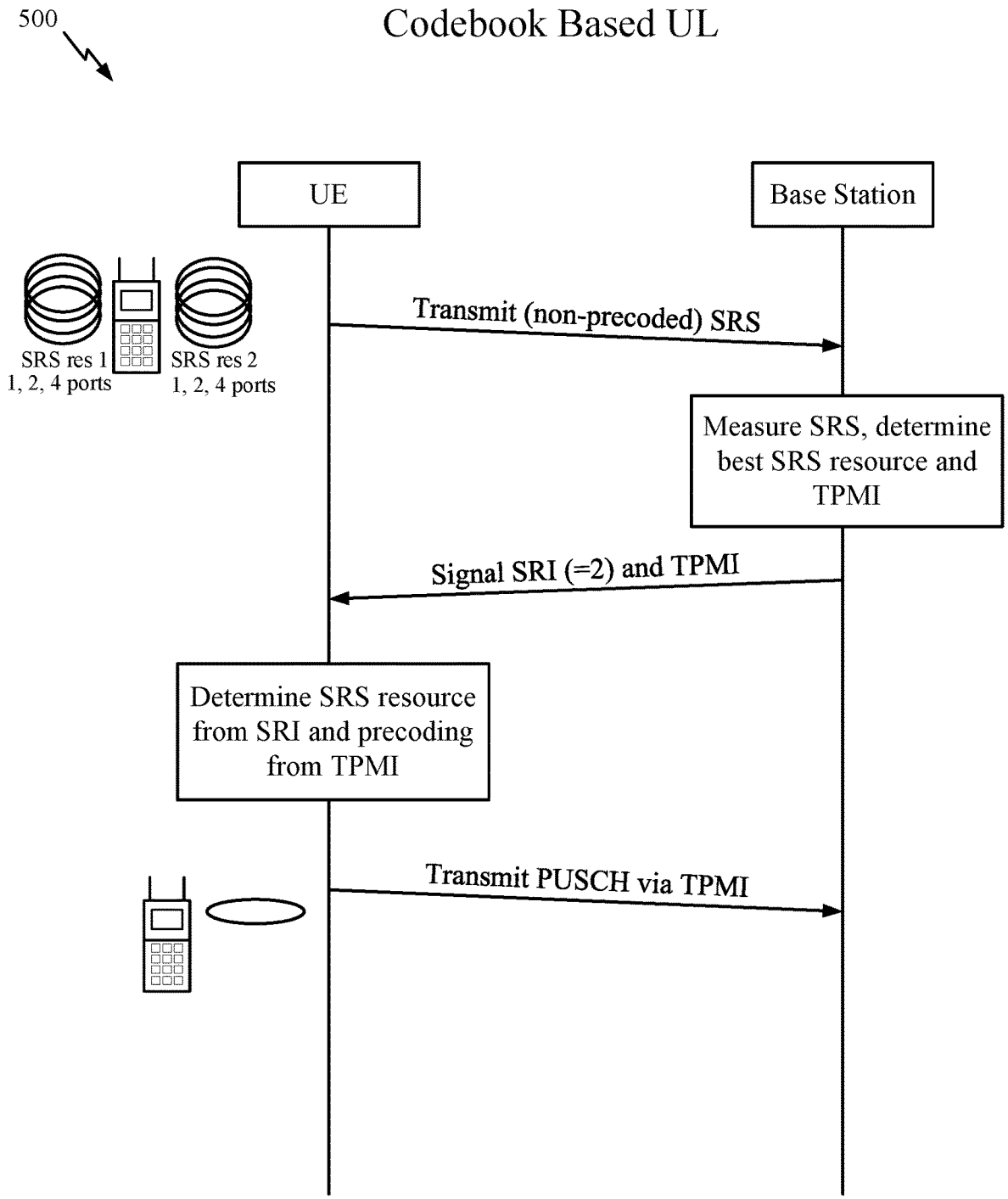
FIG. 5 is a call flow diagram illustrating an example of codebook based UL transmission.
Figure 6:
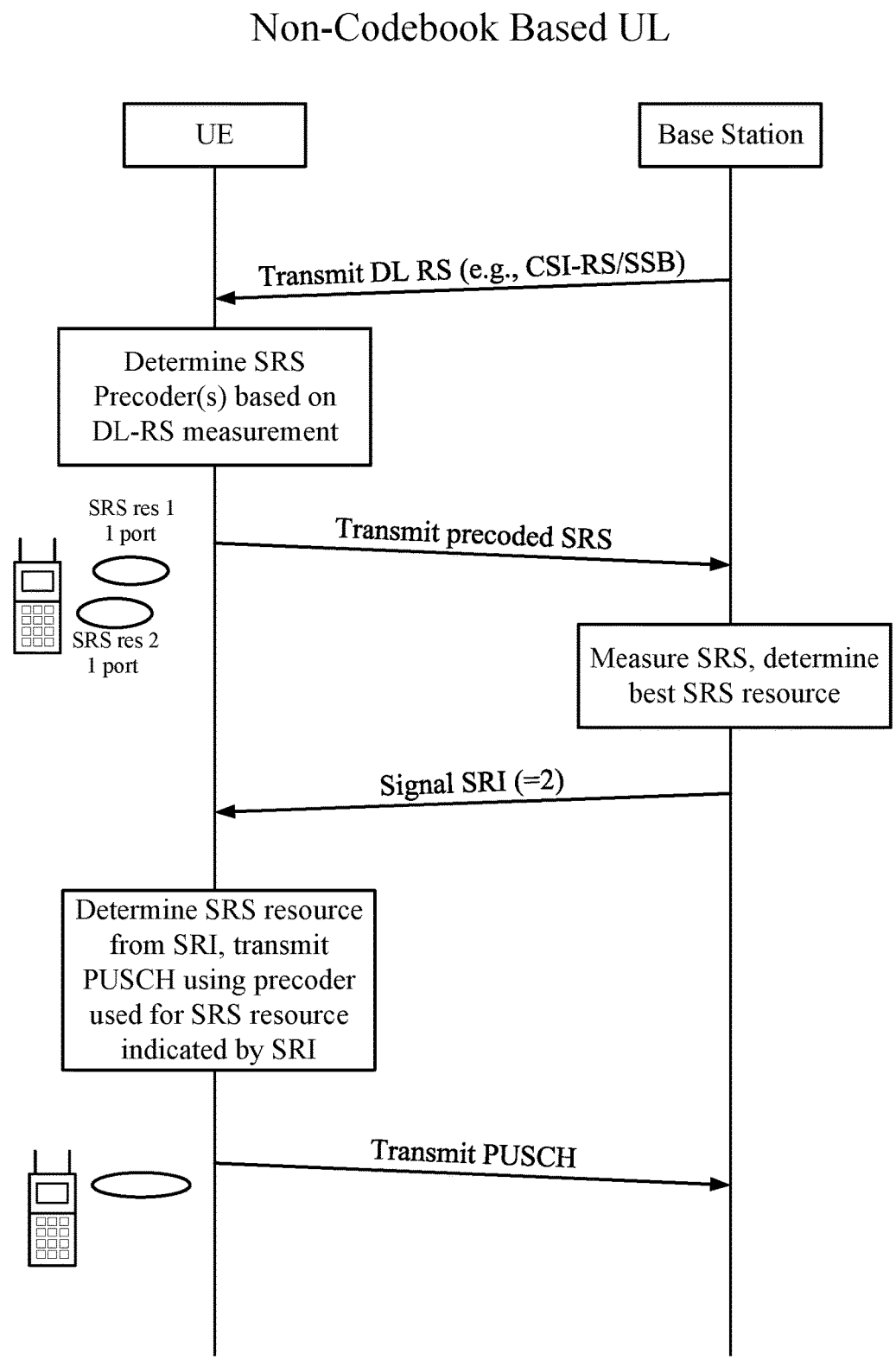
FIG. 6 is a call flow diagram illustrating an example of non-codebook based UL transmission.

As illustrated in FIGS. 5 and 6, conventional (e.g., legacy NR Release 15 and 16 systems) use cases of sounding reference signal (SRS) transmissions include codebook-based transmission and non-codebook-based transmission schemes for uplink transmissions with wideband precoders. Codebook-based UL transmission is based on BS feedback and can be used in cases where reciprocity may not hold.

FIG. 5 is a call flow diagram 500 illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI. The UE determines the selected SRS resource from the SRI and precoding from TPMI and transmits PUSCH accordingly.

FIG. 6 is a call flow diagram 600 illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resource. In this case, since the UE sent the SRS precoded, by selecting the SRS resource, the gNB is effectively also selecting precoding. For non-codebook based UL transmission, each SRS resource corresponds to a layer. The precoder of the layer is actually the precoder of the SRS, which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI. In this case, the UE determines the selected SRS resource from the SRI, selects the same precoder used when sending that selected SRS resource, and transmits PUSCH accordingly.

Example Configuration for UE Intra-Frequency Measurement of SRS

Figure 7:
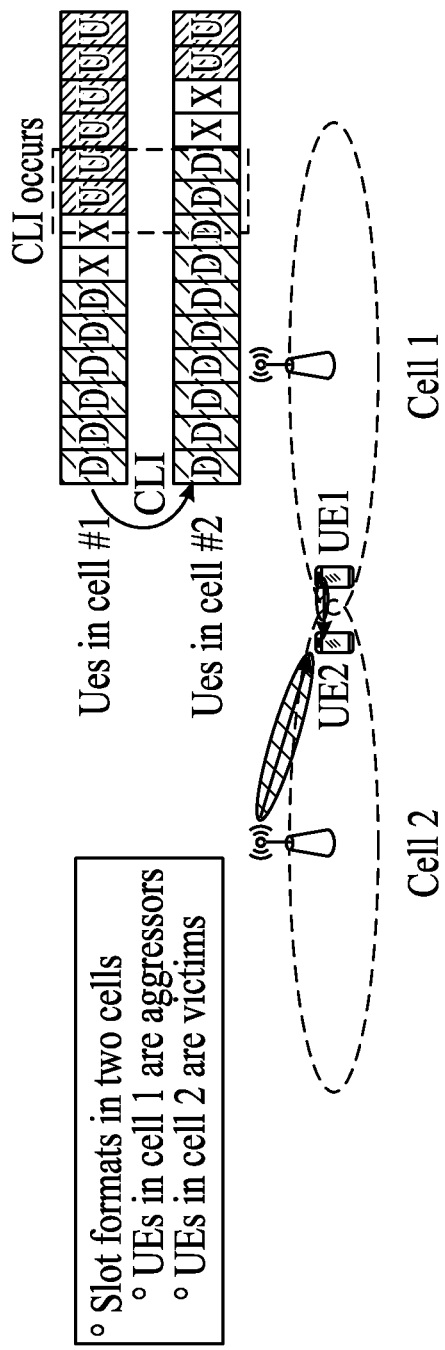
FIG. 7 illustrates an example of interfering user equipments (UEs).

Aspects of the present disclosure relate to wireless communications, and more particularly, to techniques for a UE to measure sounding reference signal (SRS) transmission from another UE. The measurements results may be used, for example, by a serving cell for interference mitigation purposes As illustrated in FIG. 7, in some cases, nearby UEs in a system may have different time division duplexed (TDD) slot format configurations. As such, one UE (UE2 in Cell 2, referred to as a victim) may receive UL transmissions from another UE (UE1 in Cell 1 referred to as an aggressor). These UL transmissions from the aggressor may be received by the victim as interference power if an UL symbol (i.e., interfering symbol) of the aggressor collides with a DL symbol of the victim.

Aspects of the present disclosure provide techniques that may allow a (victim) UE to be configured to perform measurement of the cross-link interference (CLI) which may help facilitate interference management. As will be described in greater detail below, in some scenarios, network can configure the victim UE to measure a sounding reference signal (SRS) transmitted by the aggressor UE.

As previously described with reference to FIGS. 5 and 6, legacy use cases of SRS includes UL channel estimation at the base station for UL MIMO precoding, UL timing synchronization and reciprocity-based DL channel estimation. For these use cases, network only needs to configure the SRS resource at the UE that transmits the SRS.

For interference measurement, SRS needs to be configured at both the aggressor UE and the victim UE (e.g., SRS transmission by the aggressor and SRS measurement at the victim). Configuration of SRS (transmission) at the aggressor UE can be performed in a same manner as the legacy use cases noted above.

Aspects of the present disclosure provide various techniques for addressing certain considerations for configuration of SRS measurements at the victim UE.

In certain systems (e.g., Rel. 16), only intra-frequency measurement of SRS may be required. As used herein, intra-frequency generally means that SRS transmitted by aggressor is within the bandwidth of an active bandwidth part (BWP) of a victim UE, as illustrated in FIG. 8.

Figure 8:
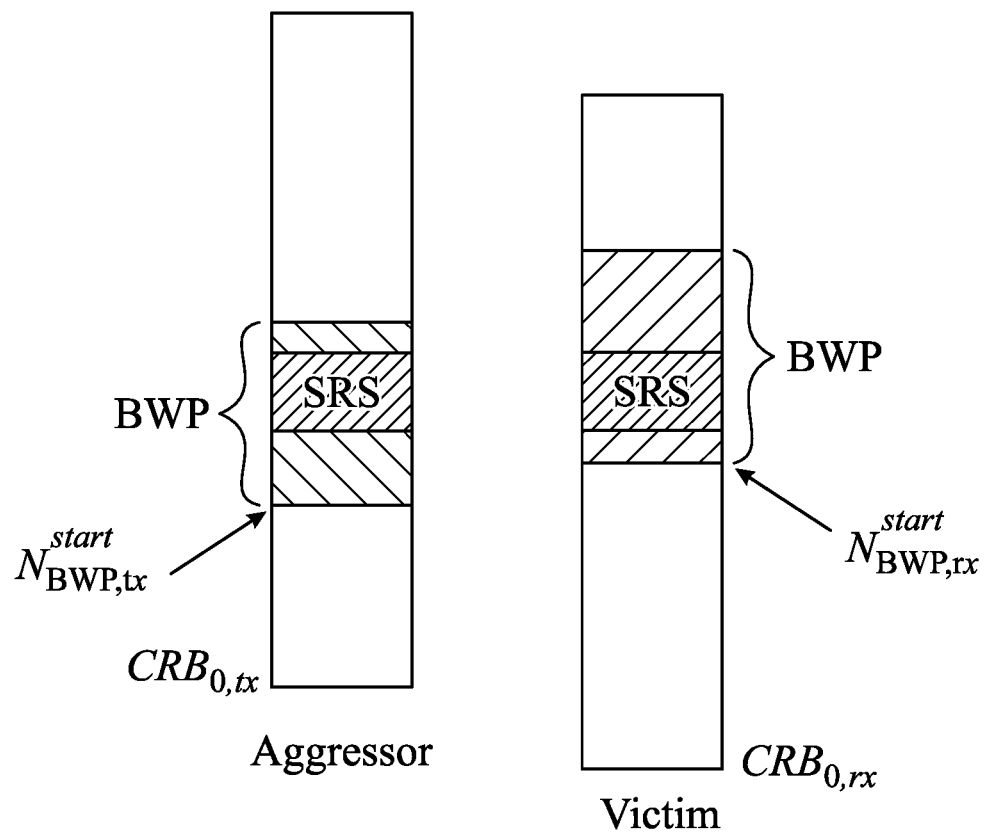
FIG. 8 illustrates an example of sounding reference signal (SRS) transmission and measurement configurations, in accordance with aspects of the present disclosure.

As illustrated in FIG. 8, $N_{BWP}^{start}$ is the lowest frequency RB of the BWP in the cell, while Common RB 0 is the lowest frequency RB of the cell (e.g., $N_{BWP,rx}^{start}$ refers to the starting RB of a BWP defined in the victim UE's serving cell). As illustrated, the equivalent SRS configuration results in same SRS sequence and resources between aggressor and victim. It may be noted that the network does not need to provide the aggressor UE's SRS configuration to victim UE directly.

In some cases, an aggressor UE and victim UE may be configured with the same subcarrier spacing (SCS) and have same RB grid. This means a frequency boundary of at least one RB of the aggressor UE's active BWP is the same as the frequency boundary of an RB of the victim UE's active BWP.

For intra-frequency SRS measurement, a victim UE may be configured with SRS measurement resources that correspond to (align with) SRS transmitted by an aggressor UE, for example, based on an equivalent (not unique) SRS configuration at the victim UE.

It may be desirable to maintain conventional SRS configuration signaling (and minimize changes) when signaling an equivalent SRS configuration. Therefore, in some cases, the equivalent SRS (measurement) configuration may be defined in a way to (essentially) mirror the SRS configuration for SRS transmission at the aggressor UE. One important piece of information provided by the equivalent SRS configuration is referred to as a frequency reference point. Along with offset parameters provided in a configuration, the frequency reference point may allow SRS to be flexibly scheduled within an active BWP.

For an SRS transmission, a frequency-domain starting position $k_0$ (e.g., the lowest RE) of the SRS may be determined based on a combination of three frequency offsets $(f_1+f_2+f_3)$. First, $f_1$ is related to frequency hopping and generally has a granularity of 4 RBs. Second, $f_2$ represents an RB level shift and generally has a granularity of 1 RB. Third, $f_3$ represents a resource element (RE) level shift.

With these three offsets, the network has the flexibility to configure a starting position of SRS at any RE in any RB within the BWP. Among these offsets, the second offset is equal to a number of $n_{shift}$ RBs, which determines the choice of one of two options for the frequency reference point.

According to a first option (Option 1), if $N_{BWP}^{start} \leq n_{shift}$ the frequency reference point (e.g., where $k_0=0$) is subcarrier 0 in a common resource block 0 ($CRB_{0,rx}$ shown in FIG. 8). Otherwise, according to a second option (Option 2), the frequency reference point is the lowest subcarrier of the BWP ($N_{BWP}^{start}$).

One reason to have options for the frequency reference point is that, in current systems, $n_{shift}$ may have a limited value range that is insufficient to allow the network flexibility to configure a starting position of SRS at any RE in any RB within the BWP. For example, $n_{shift}$ may have a limited value range that only allows for a maximum shift of 268 RBs, which corresponds to about 50 MHz for 15 kHz SCS. If the cell has a carrier bandwidth wider than this range, the network may not be able to configure SRS in the full bandwidth if common RB 0 is always used as the reference point.

For SRS measurement by a victim UE, since the active BWP/CRB0 of the victim is in general (likely to be) different than the active BWP/CRB0 of the aggressor, the victim UE may need to determine an equivalent $N_{BWP}^{start}$ for it to measure the SRS in victim UE's serving cell.

Figure 9:
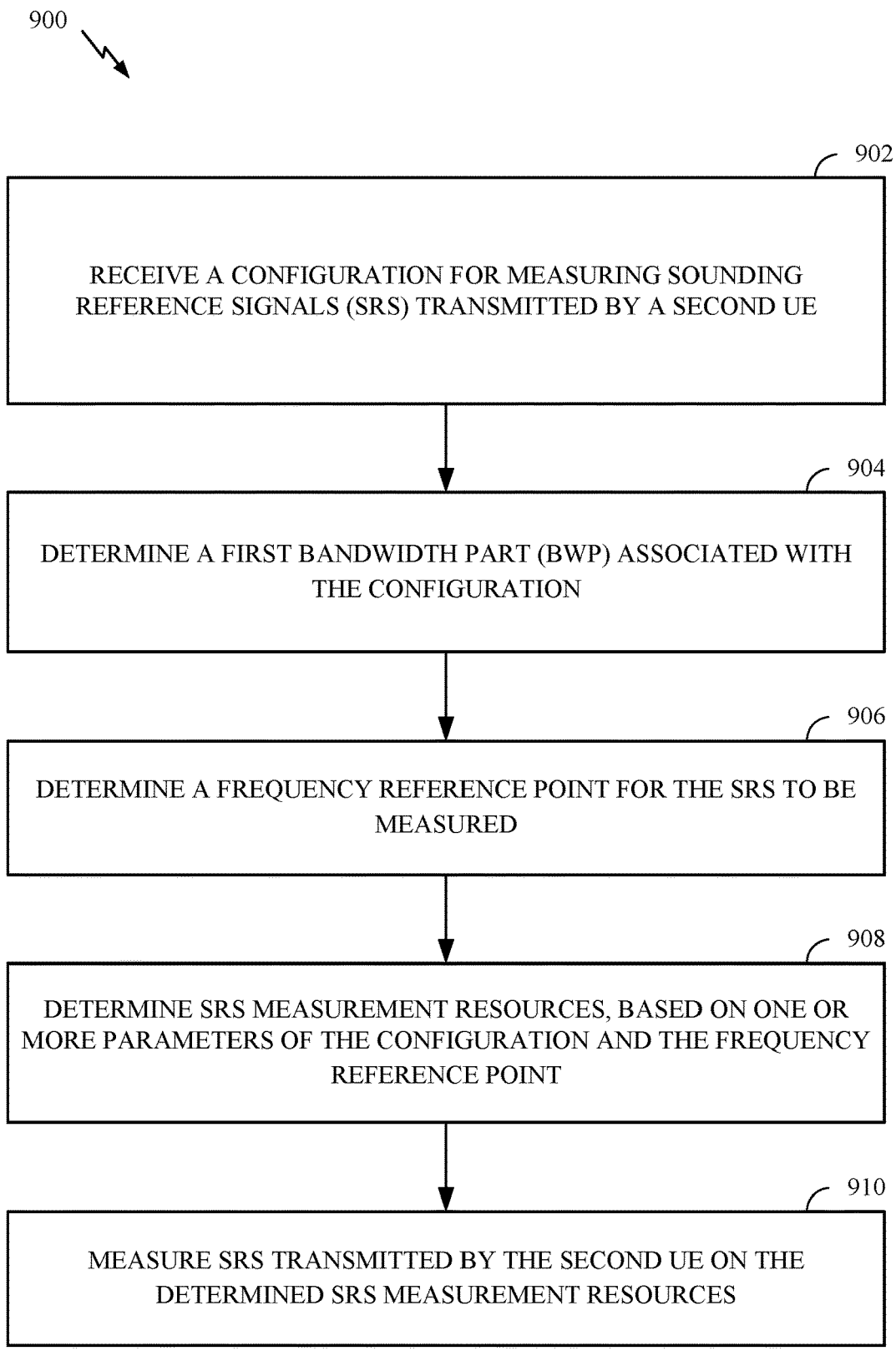
FIG. 9 illustrates example operations for wireless communication by a UE, in accordance with certain aspects of the present disclosure.

FIG. 9 illustrates example operations 900 for SRS measurement by a first UE (e.g., a victim UE), in accordance with certain aspects of the present disclosure. Operations 900 may be performed, for example, by a UE 120 of FIG. 1 or FIG. 3.

Operations 900 begin, at 902, by receiving a configuration for measuring sounding reference signals (SRS) transmitted by a second UE. At 904, the first UE determines a first bandwidth part (BWP) associated with the configuration. At 906, the first UE determines a frequency reference point for the SRS to be measured. At 908, the first UE determines SRS measurement resources, based on one or more parameters of the configuration and the frequency reference point. At 910, the first UE measures SRS transmitted by the second UE on the determined SRS measurement resources.

Figure 10:
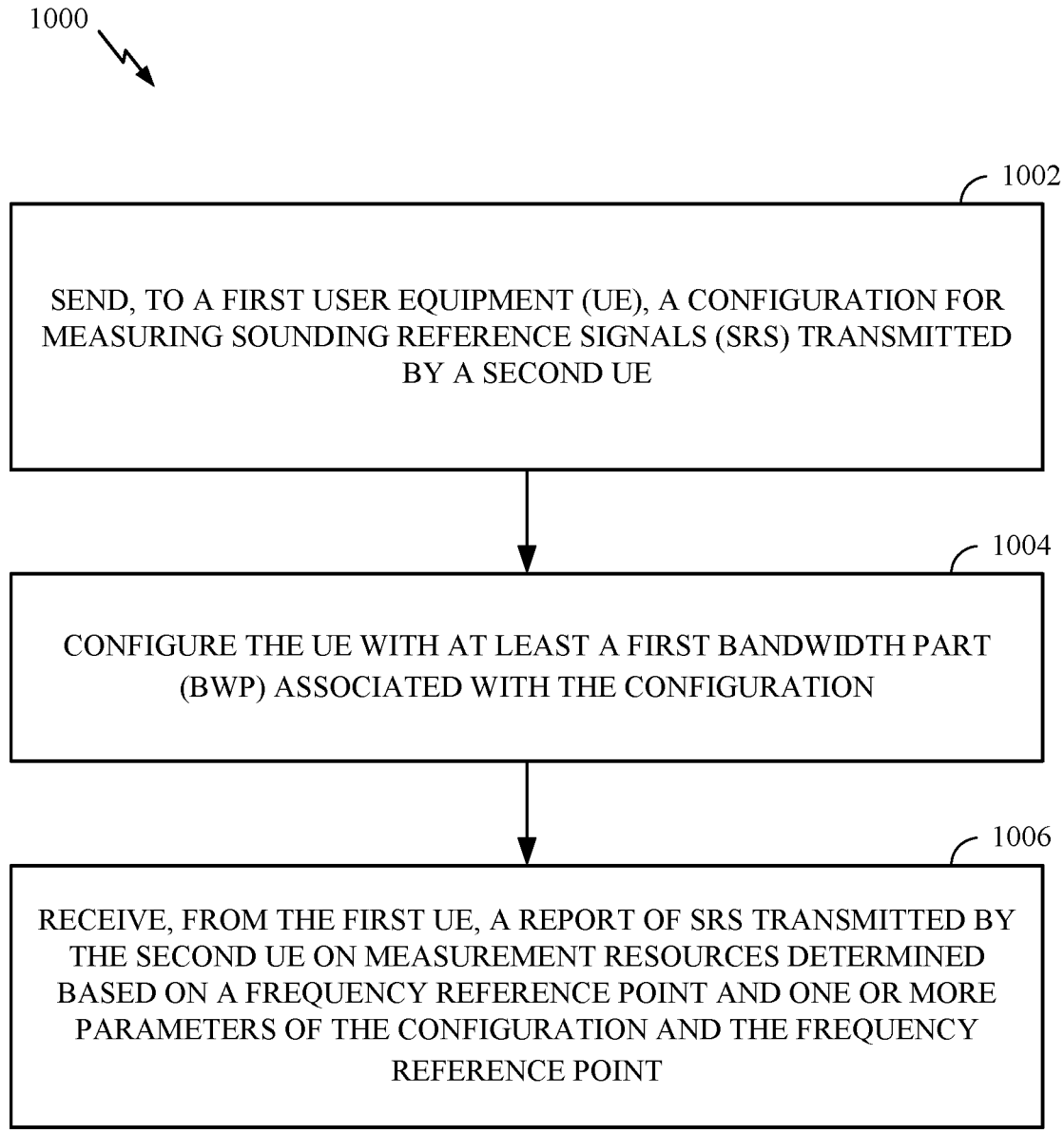
FIG. 10 illustrates example operations for wireless communication by a network entity, in accordance with certain aspects of the present disclosure.

FIG. 10 illustrates example operations 1000 for wireless communications by a network entity and may be considered complementary to operations 900 of FIG. 9. For example, operations 1000 may be performed by a gNB to configure a victim UE (performing operations 900 of FIG. 9) for SRS measurement, in accordance with certain aspects of the present disclosure.

Operations 1000 begin, at 1002, by sending, to a first user equipment (UE), a configuration for measuring sounding reference signals (SRS) transmitted by a second UE. At 1004, the network entity configures the UE with at least a first bandwidth part (BWP) associated with the configuration. At 1006, the network entity receives, from the first UE, a report of SRS transmitted by the second UE on measurement resources determined based on a frequency reference point and one or more parameters of the configuration and the frequency reference point.

As noted above, an equivalent SRS configuration may provide a $N_{BWP,rx}^{start}$ (given $CRB_{0,rx}$ is already configured) for the victim UE to determine the frequency reference point for SRS measurement.

One approach to provide sufficient information for the victim UE to determine a frequency reference point for SRS measurement is to have a BWP configured for the victim associated with the SRS configuration. There are various potential options available for such an association.

According to one option, the SRS measurement may be configured within the configuration of a BWP for wireless communications. In such cases, the UE may use the starting RB of the associated BWP as $N_{BWP,rx}^{start}$ for SRS reception. According to another option, a BWP-ID of a BWP configured to the victim UE for wireless communications may be included in the SRS configuration. In such cases, the UE may use the starting RB of this BWP as $N_{BWP,rx}^{start}$ for SRS reception. According to a third option, a starting RB of a BWP may be included in the SRS configuration. In such cases, the UE may use this starting RB as $N_{BWP,rx}^{start}$ for SRS reception. This BWP is either a BWP configured to the victim UE for wireless communications or a virtual BWP that is not configured to the victim UE for wireless communications. For the virtual BWP, one, multiple, or all of the other BWP configurations except for the starting RB including BWP-ID and frequency bandwidth are not provided by network. In either option, since this $N_{BWP,rx}^{start}$ is not for the original BWP of the aggressor UE where SRS is transmitted, it is essentially a reference BWP starting RB value.

There are various proposals for determining the frequency reference point for a victim UE to use for SRS measurement purposes (e.g., to use for determining SRS measurement resources).

According to a first proposal, if BWP starting RB information is provided for SRS measurement by including the BWP-ID or the starting RB of a BWP configured to the UE in the SRS configuration, and if the BWP-ID or the starting RB is optionally not included in the SRS configuration, the frequency reference point for the SRS to be measured may be determined as subcarrier 0 in common resource block 0 of the serving cell for the victim UE.

Due to the potential flexibility of SRS configuration, certain restrictions may be implemented. Without any such restriction, when a network associates an SRS (measurement configuration) with a BWP configured for a victim UE for wireless communications (either including SRS configuration within BWP configuration or including BWP-ID or starting RB in SRS configuration), it is possible that the frequency range of the configured SRS (measurement resources) may exceed the bandwidth of the associated BWP. This scenario should be avoided because the UE should be able to at least measure the SRS in the associated BWP if the associated BWP itself is not a virtual BWP.

In some cases, a victim UE may not expect the network to configure an SRS measurement resource for the UE and associate a BWP with the SRS configuration, where the frequency range of the SRS exceeds the frequency bandwidth of the associated BWP if the associated BWP is not a virtual BWP. Further, in some cases, a victim UE may not expect the network to configure an SRS measurement resource for the UE and associate a BWP with the SRS configuration where the SCS of the SRS is different than the SCS of the associated BWP if the associated BWP is not a virtual BWP. Thus, in both of these scenarios, if the UE encounters any of these SRS configurations that do not satisfy the conditions above, the victim UE will not measure SRS in these cases (e.g., may treat the SRS measurement configurations as an error case).

In some cases, if an SRS is associated with a BWP configured for the victim UE, there may be a decision as to whether the UE should measure this SRS in another BWP if another BWP is not a virtual BWP, which is different than the BWP associated with the SRS configuration. There are various options for handling such a case when an SRS configuration for measurement is associated with a BWP configured to the victim UE.

According to a first option, the UE may be configured by the network or specified by wireless standards to not measure the configured SRS measurement resource in a BWP other than the associated BWP if the associated BWP is not a virtual BWP. This is relatively simple solution, aligned with a "per BWP" configuration for normal measurement.

According to a second option, a UE may be configured to measure the configured SRS measurement resource in a second BWP if the second BWP is not a virtual BWP (other than the associated BWP) using BWP starting RB of the associated BWP if certain conditions are met (e.g., if the SRS is fully within the bandwidth of the second BWP, and if the SCS of the SRS and the second BWP are the same). This approach may help optimize signaling efficiency (such as maximizing the RRC signaling efficiency), but may also require more operation for checking the configuration by the victim UE.

Given the possibility of this second option, the UE may be required to perform cross-BWP measurement (e.g., with SRS configured in one BWP for measurement in another BWP). In this case, various restrictions (similar to those mentioned above) may be implemented. For example, a UE may not expect the network to configure an SRS measurement resource and associate a BWP with the SRS configuration, where the frequency range of the SRS exceeds the frequency bandwidth of every BWP configured for wireless communications to the UE. Further, the UE may not expect the network to configure an SRS measurement resource and associate a BWP with the SRS configuration, where the SCS of the SRS is different than the SCS of every BWP configured for wireless communications for the UE. Thus, in both of these scenarios, if the UE encounters any of these SRS configurations that do not satisfy the conditions above, the victim UE will not measure SRS in these cases (e.g., may treat the SRS measurement configurations as an error case).

In some cases, a UE may be limited to support a maximum number of SRS measurement resources. For example, there can be various UE capabilities that might restrict the maximum number of supported SRS measurement resources.

Figure 11:
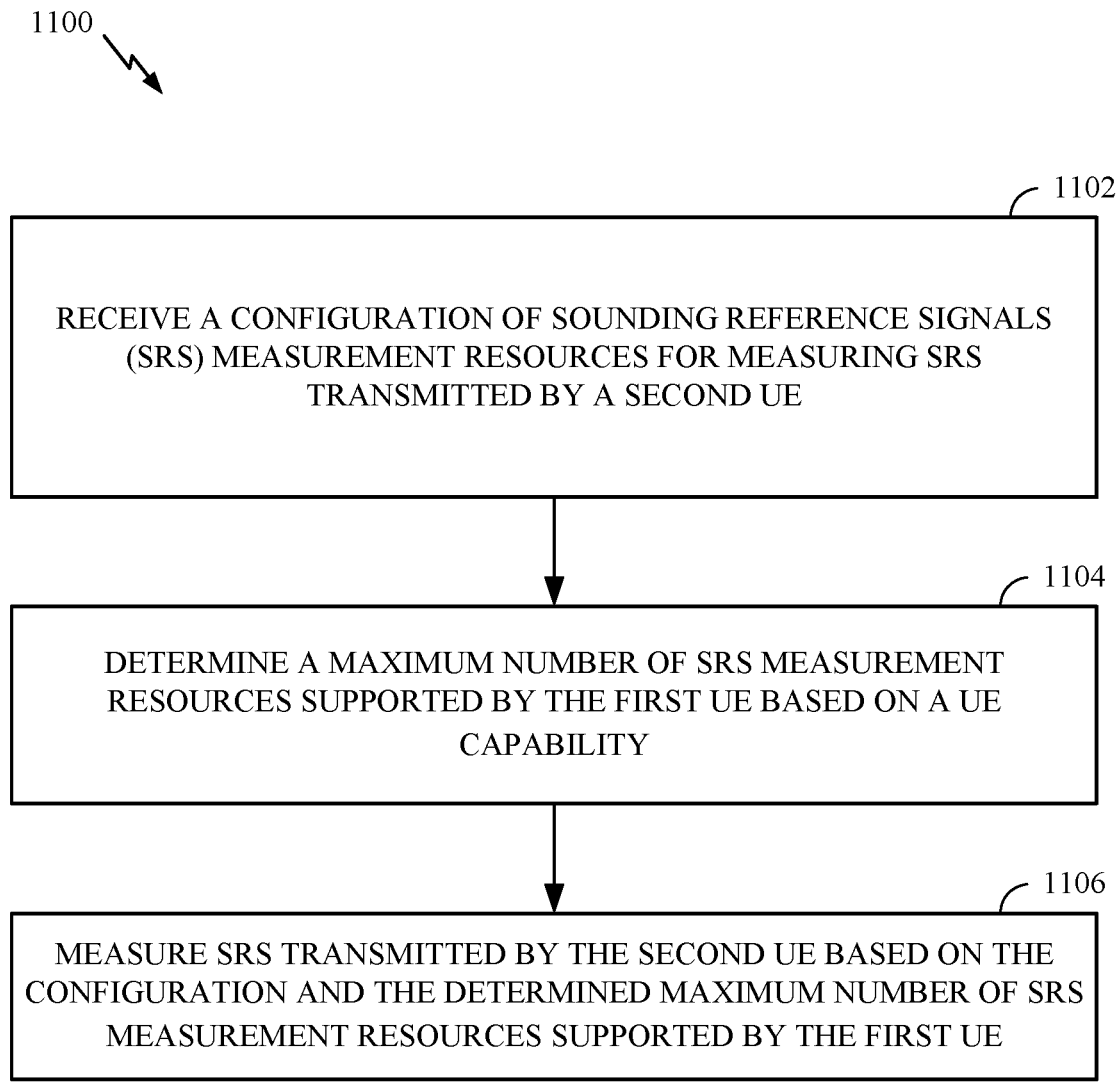
FIG. 11 illustrates example operations for wireless communication by a UE, in accordance with certain aspects of the present disclosure.

FIG. 11 illustrates example operations 1100 for SRS measurement subject to a maximum number of supported SRS measurement resources by a first UE (e.g., a victim UE), in accordance with certain aspects of the present disclosure. Operations 900 may be performed, for example, by a UE 120 of FIG. 1 or FIG. 3.

Operations 1100 begin, at 1102, by receiving a configuration of sounding reference signals (SRS) measurement resources for measuring SRS transmitted by a second UE. At 1104, the first UE determines a maximum number of SRS measurement resources supported by the first UE based on a UE capability. At 1106, the first UE measures SRS transmitted by the second UE based on the configuration and the determined maximum number of SRS measurement resources supported by the first UE.

Figure 12:
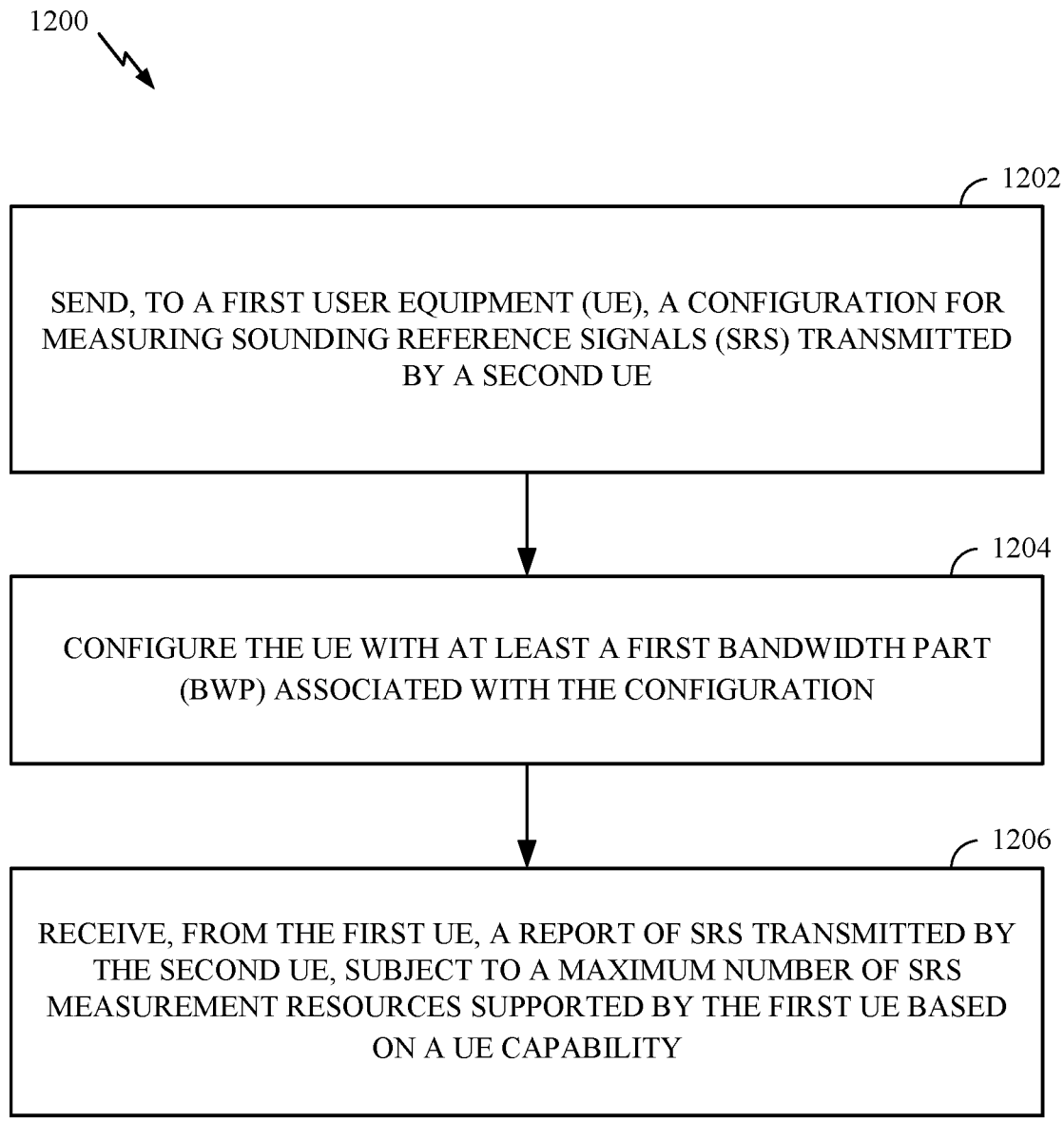
FIG. 12 illustrates example operations for wireless communication by a network entity, in accordance with certain aspects of the present disclosure.

FIG. 12 illustrates example operations 1200 for wireless communications by a network entity and may be considered complementary to operations 1100 of FIG. 11. For example, operations 1200 may be performed by a gNB to configure a victim UE (performing operations 1100 of FIG. 11) for SRS measurement, in accordance with certain aspects of the present disclosure.

Operations 1200 begin, at 1202, by sending, to a first user equipment (UE), a configuration for measuring sounding reference signals (SRS) transmitted by a second UE. At 1204, the network entity configures the UE with at least a first bandwidth part (BWP) associated with the configuration. At 1206, the network entity receives, from the first UE, a report of SRS transmitted by the second UE, subject to a maximum number of SRS measurement resources supported by the first UE based on a UE capability.

Various types of UE capability may restrict the maximum number of SRS measurement resources a victim UE can support. For example, the UE capability may be a standalone maximum number for SRS measurement resources, and/or a joint maximum number for the SRS measurement resources together with CSI-RS and SSB resources, the latter two are legacy resources for UE measurement.

In some cases, for tracking the maximum number of SRS resources, the UE may count a total number of ports across the configured resources against the maximum number. In other cases, the UE may count the total number of the configured resources against the maximum number.

There are various options for handling the case if an SRS measurement resource is configured but the UE is not required to measure the resource in the current active BWP of the UE. According to a first option, this SRS resource may be counted in the number of resources for measurement and the number is subject to UE capability. This results in a relatively lower number of resources for the UE to measure. According to a second option, this SRS is not counted in the number of resources for measurement and the number is subject to UE capability.

Figure 13:
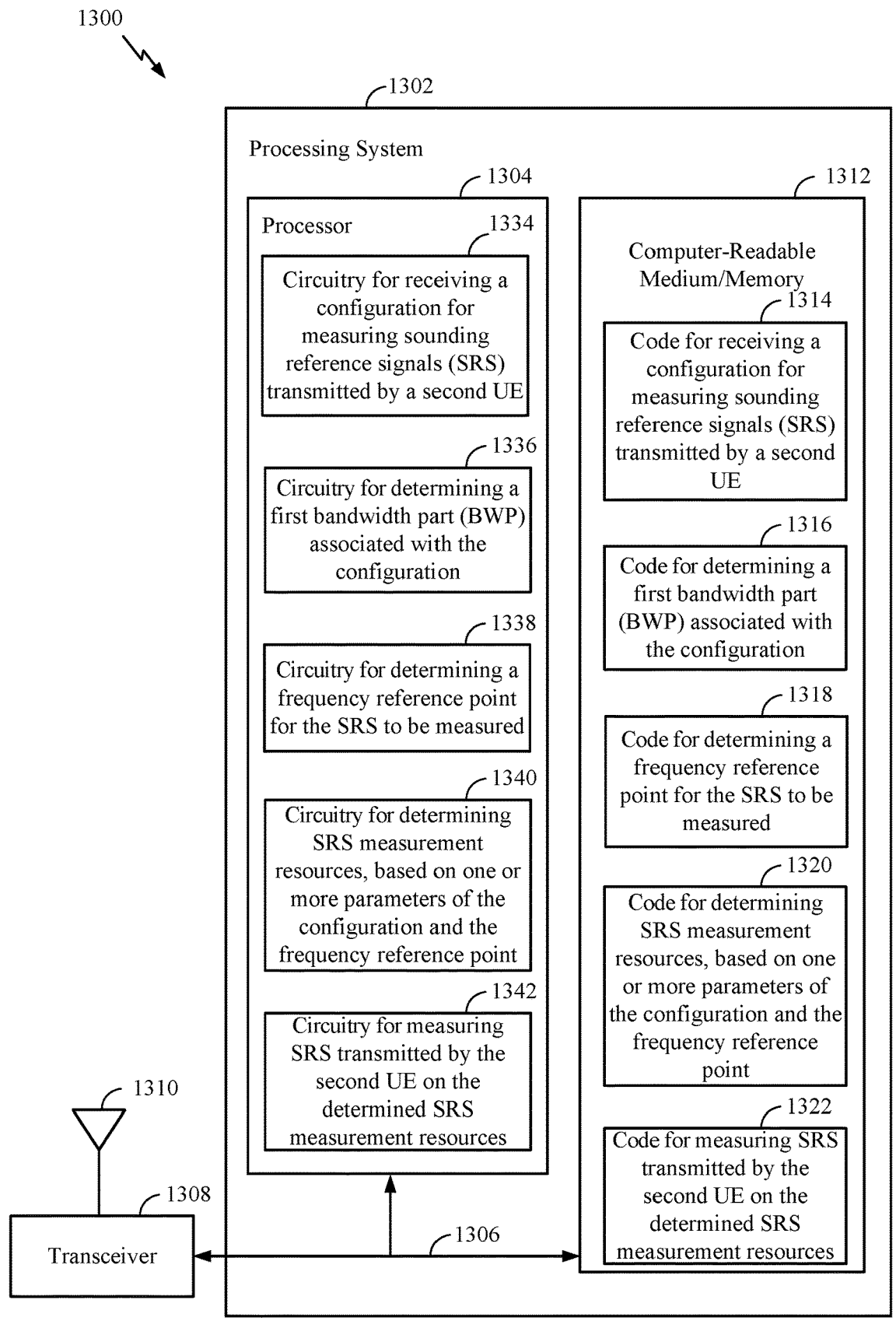
FIG. 13 illustrates a communications device that may include various components configured to perform operations for the techniques disclosed herein, in accordance with aspects of the present disclosure.

FIG. 13 illustrates a communications device 1300 (e.g., a first UE) that may include various components (e.g., corresponding to means-plus-function components) configured to perform operations for the techniques disclosed herein, such as the operations 900 illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations 900 illustrated in FIG. 9, or other operations for performing the various techniques discussed herein. In certain aspects, computer-readable medium/memory 1312 stores code 1314 for receiving a configuration for measuring sounding reference signals (SRS) transmitted by a second UE, code 1316 for determining a first bandwidth part (BWP) associated with the configuration, code 1318 for determining a frequency reference point for the SRS to be measured, code 1320 for determining SRS measurement resources, based on one or more parameters of the configuration and the frequency reference point, and code 1322 for measuring SRS transmitted by the second UE on the determined SRS measurement resources. In certain aspects, the processor 1304 has circuitry configured to implement the code stored in the computer-readable medium/memory 1313. The processor 1304 includes circuitry 1334 for receiving a configuration for measuring sounding reference signals (SRS) transmitted by a second UE, circuitry 1336 for determining a first bandwidth part (BWP) associated with the configuration, circuitry 1338 for determining a frequency reference point for the SRS to be measured, circuitry 1340 for determining SRS measurement resources, based on one or more parameters of the configuration and the frequency reference point, and circuitry 1342 for measuring SRS transmitted by the second UE on the determined SRS measurement resources.

Figure 14:
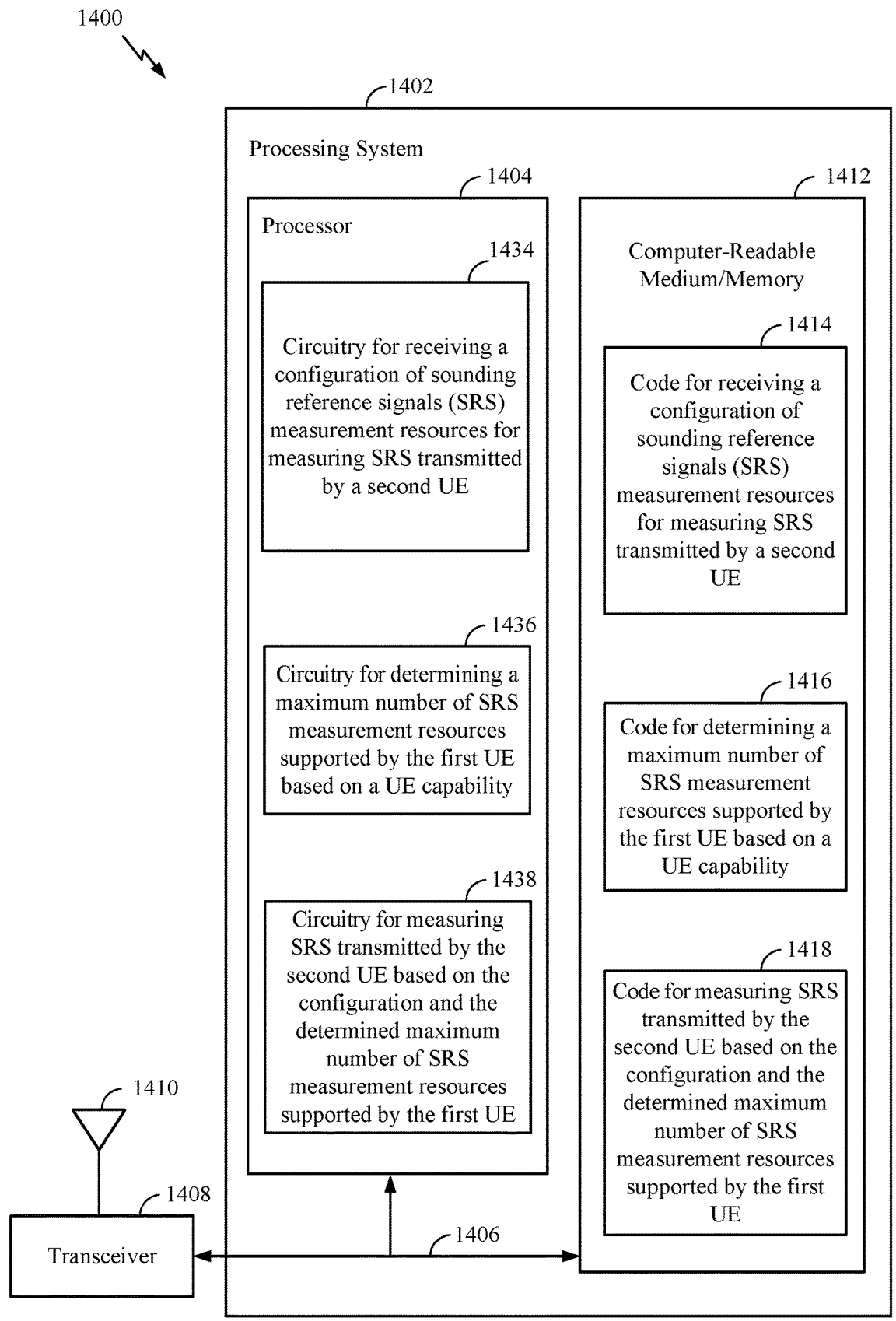
FIG. 14 illustrates a communications device that may include various components configured to perform operations for the techniques disclosed herein, in accordance with aspects of the present disclosure.

FIG. 14 illustrates a communications device 1400 (e.g., a first UE) that may include various components (e.g., corresponding to means-plus-function components) configured to perform operations for the techniques disclosed herein, such as the operations 1000 illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations 1000 illustrated in FIG. 10, or other operations for performing the various techniques discussed herein. In certain aspects, computer-readable medium/memory 1412 stores code 1414 for receiving a configuration of sounding reference signals (SRS) measurement resources for measuring SRS transmitted by a second UE, code 1416 for determining a maximum number of SRS measurement resources supported by the first UE based on a UE capability, and code 1418 for measuring SRS transmitted by the second UE based on the configuration and the determined maximum number of SRS measurement resources supported by the first UE. In certain aspects, the processor 1404 has circuitry configured to implement the code stored in the computer-readable medium/memory 1412. The processor 1404 includes circuitry 1434 for receiving a configuration of sounding reference signals (SRS) measurement resources for measuring SRS transmitted by a second UE, circuitry 1436 for determining a maximum number of SRS measurement resources supported by the first UE based on a UE capability, and circuitry 1438 for measuring SRS transmitted by the second UE based on the configuration and the determined maximum number of SRS measurement resources supported by the first UE.

Figure 15:
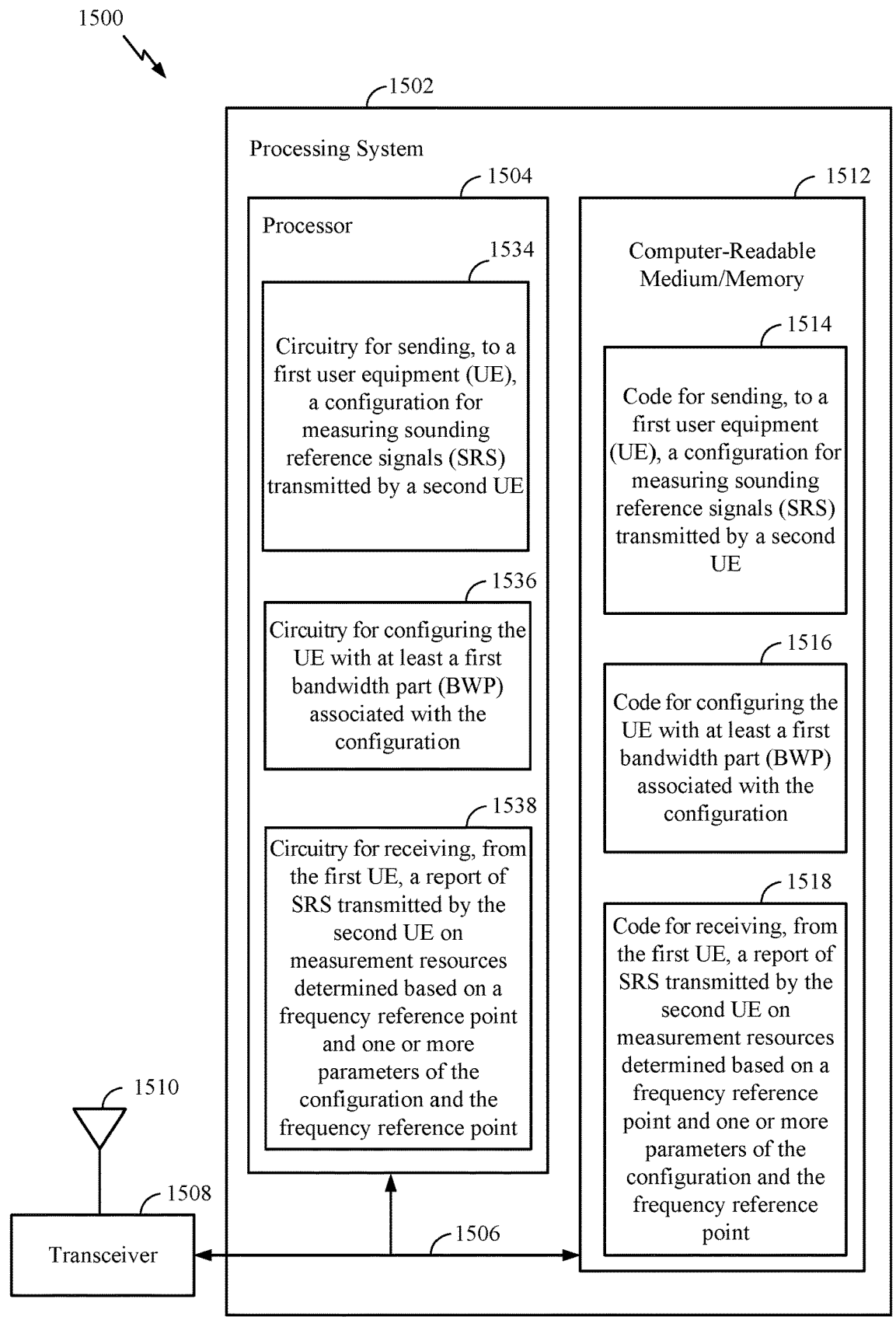
FIG. 15 illustrates a communications device that may include various components configured to perform operations for the techniques disclosed herein, in accordance with aspects of the present disclosure.

FIG. 15 illustrates a communications device 1500 (e.g., a network entity) that may include various components (e.g., corresponding to means-plus-function components) configured to perform operations for the techniques disclosed herein, such as the operations 1100 illustrated in FIG. 11. The communications device 1500 includes a processing system 1502 coupled to a transceiver 1508 (e.g., a transmitter and/or a receiver). The transceiver 1508 is configured to transmit and receive signals for the communications dev ice 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations 1100 illustrated in FIG. 11, or other operations for performing the various techniques discussed herein. In certain aspects, computer-readable medium/memory 1512 stores code 1514 for sending, to a first user equipment (UE), a configuration for measuring sounding reference signals (SRS) transmitted by a second UE, code 1516 for configuring the UE with at least a first bandwidth part (BWP) associated with the configuration, and code 1518 for receiving, from the first UE, a report of SRS transmitted by the second UE on measurement resources determined based on a frequency reference point and one or more parameters of the configuration and the frequency reference point. In certain aspects, the processor 1504 has circuitry configured to implement the code stored in the computer-readable medium/memory 1515. The processor 1504 includes circuitry 1534 for sending, to a first user equipment (UE), a configuration for measuring sounding reference signals (SRS) transmitted by a second UE, circuitry 1536 for configuring the UE with at least a first bandwidth part (BWP) associated with the configuration, and circuitry 1538 for receiving, from the first UE, a report of SRS transmitted by the second UE on measurement resources determined based on a frequency reference point and one or more parameters of the configuration and the frequency reference point.

Figure 16:
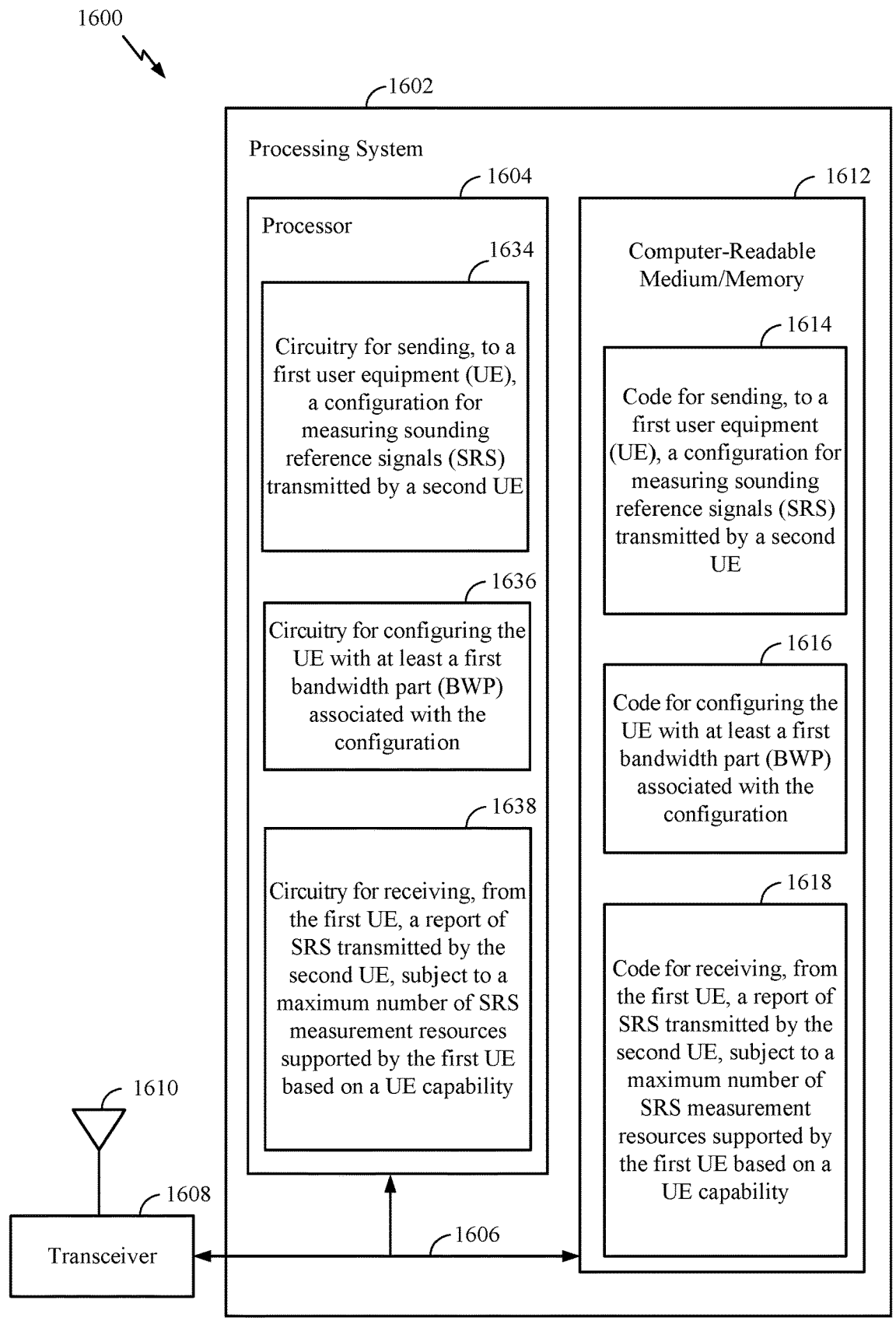
FIG. 16 illustrates a communications device that may include various components configured to perform operations for the techniques disclosed herein, in accordance with aspects of the present disclosure.

FIG. 16 illustrates a communications device 1600 (e.g., a network entity) that may include various components (e.g., corresponding to means-plus-function components) configured to perform operations for the techniques disclosed herein, such as the operations 1200 illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations 1200 illustrated in FIG. 12, or other operations for performing the various techniques discussed herein. In certain aspects, computer-readable medium/memory 1612 stores code 1614 for sending, to a first user equipment (UE), a configuration for measuring sounding reference signals (SRS) transmitted by a second UE, code 1616 for configuring the UE with at least a first bandwidth part (BWP) associated with the configuration, and code 1618 for receiving, from the first UE, a report of SRS transmitted by the second UE, subject to a maximum number of SRS measurement resources supported by the first UE based on a UE capability. In certain aspects, the processor 1604 has circuitry configured to implement the code stored in the computer-readable medium/memory 1612. The processor 1604 includes circuitry 1634 for sending, to a first user equipment (UE), a configuration for measuring sounding reference signals (SRS) transmitted by a second UE, circuitry 1636 for configuring the UE with at least a first bandwidth part (BWP) associated with the configuration, and circuitry 1638 for receiving, from the first UE, a report of SRS transmitted by the second UE, subject to a maximum number of SRS measurement resources supported by the first UE based on a UE capability.

Example Aspects

Aspect 1: A method for wireless communications by a first user equipment (UE), comprising: receiving a configuration for measuring sounding reference signals (SRS) transmitted by a second UE; determining a first bandwidth part (BWP) associated with the configuration; determining a frequency reference point for the SRS to be measured; determining SRS measurement resources, based on one or more parameters of the configuration and the frequency reference point; and measuring SRS transmitted by the second UE on the determined SRS measurement resources.

Aspect 2: The method of Aspect 1, wherein: the configuration for measuring SRS is provided within a configuration of the first BWP; the first BWP is identified via a BWP-ID included in the configuration for measuring SRS; or a starting RB of the first BWP is included in the configuration for measuring SRS, and the first BWP is either: a BWP configured to the first UE for wireless communications; or a virtual BWP that is not configured to the first UE for wireless communications and one, multiple or all the other BWP configurations including BWP-ID and frequency bandwidth of the virtual BWP are not provided by network.

Aspect 3: The method of Aspect 1 or 2, wherein, the frequency reference point is determined as either: a lowest subcarrier of the first BWP; or a lowest subcarrier of a common resource block of a serving cell for the first UE, depending on a value of a parameter indicating a shift in terms of a number of resource blocks (RBs) relative to a starting RB of the first BWP.

Aspect 4: The method of any one of Aspects 1-3, wherein, if the first BWP is not identified via a BWP-ID included in the configuration for measuring SRS or a starting RB of the first BWP is not included in the configuration for measuring SRS, the frequency reference point is determined as a lowest subcarrier of a common resource block of a serving cell for the first UE.

Aspect 5: The method of Aspect 1 or 2, wherein the first UE considers the configuration as invalid if a frequency range of the determined SRS measurement resources exceeds a frequency bandwidth of the first BWP that is configured for wireless communications and is not a virtual BWP.

Aspect 6: The method of Aspect 1 or 2, wherein the first UE considers the configuration as invalid if a subcarrier spacing (SCS) of the determined SRS measurement resources is different from an SCS of the first BWP that is configured for wireless communications and is not a virtual BWP.

Aspect 7: The method of Aspect 1, wherein the UE is configured to only measure SRS measurement resources within the first BWP if the first BWP is configured for wireless communications and is not a virtual BWP.

Aspect 8: The method of Aspect 1, wherein: the UE is configured with at least a second BWP for wireless communications that is not a virtual BWP; and the UE is configured to measure SRS measurement resources within a second BWP if one or more conditions are met.

Aspect 9: The method of Aspect 8, wherein the one or more conditions comprise: frequency range of the SRS measurement resources is fully within the bandwidth of the second BWP; and the SRS measurement resources and the second BWPs have a same subcarrier spacing (SCS).

Aspect 10: The method of Aspect 9, wherein the frequency reference point comprises: a starting resource block (RB) of the first BWP; or a lowest subcarrier of a common resource block of a serving cell for the first UE, depending on a value of a parameter indicating a shift in terms of a number of resource blocks (RBs) relative to a starting RB of the first BWP.

Aspect 11: The method of Aspect 8, wherein the first UE considers the configuration as invalid if a frequency range of the determined SRS measurement resources exceeds a frequency bandwidth of both the first BWP, if the first BWP is configured for wireless communications and is not a virtual BWP, and the second BWP.

Aspect 12: The method of Aspect 8, wherein the first UE considers the configuration as invalid if a subcarrier spacing (SCS) of the determined SRS measurement resources is different from an SCS of both the first BWP if the first BWP is configured for wireless communications and is not a virtual BWP and the second BWP.

Aspect 13: A method for wireless communications by a first user equipment (UE), comprising: receiving a configuration of sounding reference signals (SRS) measurement resources for measuring SRS transmitted by a second UE; determining a maximum number of SRS measurement resources supported by the first UE based on a UE capability; and measuring SRS transmitted by the second UE based on the configuration and the determined maximum number of SRS measurement resources supported by the first UE.

Aspect 14: The method of Aspect 13, wherein the capability comprises at least one of: a standalone max number for SRS measurement resources; or a joint maximum number for SRS measurement resources together with at least one of channel state information reference signal (CSI-RS) or synchronization signal block (SSB) resources.

Aspect 15: The method of Aspect 13 or 14, wherein: the UE counts a total number of ports across the configured resources against the maximum number; or the UE counts a total number of the configured resources against the maximum number.

Aspect 16: The method of Aspect 13, further comprising, if an SRS measurement resource is configured but the UE is not required to measure the resource in a current active BWP, deciding whether or not to count that SRS measurement resource against the maximum number.

Aspect 17: The method of Aspect 16, wherein the UE counts that SRS resource against the maximum number.

Aspect 18: The method of Aspect 16, wherein the UE does not count that SRS resource against the maximum number.

Aspect 19: A method for wireless communications by a network entity, comprising: sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE on measurement resources determined based on a frequency reference point and one or more parameters of the configuration and the frequency reference point.

Aspect 20: The method of Aspect 19, wherein: the configuration for measuring SRS is provided within a configuration of the first BWP; the first BWP is identified via a BWP-ID included in the configuration for measuring SRS; or a starting RB of the first BWP is included in the configuration for measuring SRS, and the first BWP is either: a BWP configured to the first UE for wireless communications; or a virtual BWP that is not configured to the first UE for wireless communications and one, multiple or all the other BWP configurations including BWP-ID and frequency bandwidth of the virtual BWP are not provided by the network entity.

Aspect 21: The method of Aspect 19 or 20, wherein, the frequency reference point is determined as either: a lowest subcarrier of the first BWP; or a lowest subcarrier of a common resource block of a serving cell for the first UE, depending on a value of a parameter indicating a shift in terms of a number of resource blocks (RBs) relative to a starting RB of the first BWP.

Aspect 22: The method of Aspect 19, wherein, if the first BWP is not identified via a BWP-ID included in the configuration for measuring SRS or a starting RB of the first BWP is not included in the configuration for measuring SRS, the frequency reference point is determined as a lowest subcarrier of a common resource block of a serving cell for the first UE.

Aspect 23: The method of Aspect 19, wherein the UE is configured to only measure SRS measurement resources within the first BWP if the first BWP is configured for wireless communications and is not a virtual BWP.

Aspect 24: The method of Aspect 19, wherein: the UE is configured with at least a second BWP for wireless communications and is not a virtual BWP; and the UE is configured to measure SRS measurement resources within a second BWP if one or more conditions are met.

Aspect 25: The method of Aspect 24, wherein the one or more conditions comprise: frequency range of the SRS measurement resources is fully within the bandwidth of the second BWP; and the SRS measurement resources and the second BWPs have a same subcarrier spacing (SCS).

Aspect 26: The method of Aspect 25, wherein the frequency reference point comprises: a starting resource block (RB) of the first BWP; or a lowest subcarrier of a common resource block of a serving cell for the first UE, depending on a value of a parameter indicating a shift in terms of a number of resource blocks (RBs) relative to a starting RB of the first BWP.

Aspect 27: A method for wireless communications by a network entity, comprising: sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE, subject to a maximum number of SRS measurement resources supported by the first UE based on a UE capability.

Aspect 28: The method of Aspect 27, wherein the capability comprises at least one of: a standalone max number for SRS measurement resources; or a joint maximum number for SRS measurement resources together with at least one of channel state information reference signal (CSI-RS) or synchronization signal block (SSB) resources.

Aspect 29: The method of Aspect 27, wherein: the UE counts a total number of ports across the configured resources against the maximum number; or the UE counts a total number of the configured resources against the maximum number.

Aspect 30: The method of Aspect 27, further comprising, if an SRS measurement resource is configured but the UE is not required to measure the resource in a current active BWP, deciding whether or not the UE is to count that SRS measurement resource against the maximum number.

Aspect 31: The method of Aspect 30, wherein the UE is to count that SRS resource against the maximum number.

Aspect 32: The method of Aspect 30, wherein the UE is not to count that SRS resource against the maximum number.

Aspect 33: An apparatus for wireless communications by a first user equipment (UE), comprising: means for receiving a configuration for measuring sounding reference signals (SRS) transmitted by a second UE; means for determining a first bandwidth part (BWP) associated with the configuration; means for determining a frequency reference point for the SRS to be measured; means for determining SRS measurement resources, based on one or more parameters of the configuration and the frequency reference point; and means for measuring SRS transmitted by the second UE on the determined SRS measurement resources.

Aspect 34: An apparatus for wireless communications by a first user equipment (UE), comprising: means for receiving a configuration of sounding reference signals (SRS) measurement resources for measuring SRS transmitted by a second UE; means for determining a maximum number of SRS measurement resources supported by the first UE based on a UE capability; and means for measuring SRS transmitted by the second UE based on the configuration and the determined maximum number of SRS measurement resources supported by the first UE.

Aspect 35: An apparatus for wireless communications by a network entity, comprising: means for sending, to a first user equipment (UE), a configuration for measuring sounding reference signals (SRS) transmitted by a second UE; means for configuring the UE with at least a first bandwidth part (BWP) associated with the configuration; and means for receiving, from the first UE, a report of SRS transmitted by the second UE on measurement resources determined based on a frequency reference point and one or more parameters of the configuration and the frequency reference point.

Aspect 36: An apparatus for wireless communications by a network entity, comprising: means for sending, to a first user equipment (UE), a configuration for measuring sounding reference signals (SRS) transmitted by a second UE; means for configuring the UE with at least a first bandwidth part (BWP) associated with the configuration; and means for receiving, from the first UE, a report of SRS transmitted by the second UE, subject to a maximum number of SRS measurement resources supported by the first UE based on a UE capability.

Aspect 37: An apparatus for wireless communications by a first user equipment (UE), comprising: a receiver configured to receive a configuration for measuring sounding reference signals (SRS) transmitted by a second UE; and at least one processor configured to determine a first bandwidth part (BWP) associated with the configuration, determine a frequency reference point for the SRS to be measured, determine SRS measurement resources, based on one or more parameters of the configuration and the frequency reference point, and measure SRS transmitted by the second UE on the determined SRS measurement resources.

Aspect 38: An apparatus for wireless communications by a first user equipment (UE), comprising: a receiver configured to receive a configuration of sounding reference signals (SRS) measurement resources for measuring SRS transmitted by a second UE; and at least one processor configured to determine a maximum number of SRS measurement resources supported by the first UE based on a UE capability and measure SRS transmitted by the second UE based on the configuration and the determined maximum number of SRS measurement resources supported by the first UE.

Aspect 39: An apparatus for wireless communications by a network entity, comprising: a transmitter configured to send, to a first user equipment (UE), a configuration for measuring sounding reference signals (SRS) transmitted by a second UE; at least one processor configured to configure the UE with at least a first bandwidth part (BWP) associated with the configuration; and a receiver configured to receive, from the first UE, a report of SRS transmitted by the second UE on measurement resources determined based on a frequency reference point and one or more parameters of the configuration and the frequency reference point.

Aspect 40: An apparatus for wireless communications by a network entity, comprising: a transmitter configured to send, to a first user equipment (UE), a configuration for measuring sounding reference signals (SRS) transmitted by a second UE; at least one processor configured to configure the UE with at least a first bandwidth part (BWP) associated with the configuration; and a receiver configured to receive, from the first UE, a report of SRS transmitted by the second UE, subject to a maximum number of SRS measurement resources supported by the first UE based on a UE capability.

Aspect 41: A computer readable medium having instruction stored thereon for: receiving, by a first user equipment (UE), a configuration for measuring sounding reference signals (SRS) transmitted by a second UE; determining a first bandwidth part (BWP) associated with the configuration; determining a frequency reference point for the SRS to be measured; determining SRS measurement resources, based on one or more parameters of the configuration and the frequency reference point; and measuring SRS transmitted by the second UE on the determined SRS measurement resources.

Aspect 42: A computer readable medium having instruction stored thereon for: receiving, by a first user equipment (UE), a configuration of sounding reference signals (SRS) measurement resources for measuring SRS transmitted by a second UE; determining a maximum number of SRS measurement resources supported by the first UE based on a UE capability; and measuring SRS transmitted by the second UE based on the configuration and the determined maximum number of SRS measurement resources supported by the first UE.

Aspect 43: A computer readable medium having instruction stored thereon for: sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE on measurement resources determined based on a frequency reference point and one or more parameters of the configuration and the frequency reference point.

Aspect 44: A computer readable medium having instruction stored thereon for: sending, to a first user equipment (UE), a configuration for measuring sounding reference signals (SRS) transmitted by a second UE; configuring the UE with at least a first bandwidth part (BWP) associated with the configuration; and receiving, from the first UE, a report of SRS transmitted by the second UE, subject to a maximum number of SRS measurement resources supported by the first UE based on a UE capability.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 3 may be configured to perform operations 900, 1000, 1100, and/or 1200 of FIGS. 9, 10, 11, and/or 12.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 9, 10, 11, and 12).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A method for wireless communications by a first user equipment (UE), comprising:
    receiving a configuration for measuring sounding reference signals (SRS) transmitted by a second UE;
    determining a first bandwidth part (BWP) associated with the configuration;
    determining a frequency reference point for the SRS to be measured;
    determining SRS measurement resources, based on one or more parameters of the configuration and the frequency reference point; and
    measuring SRS transmitted by the second UE on the determined SRS measurement resources.

2. The method of claim 1, wherein:
    the configuration for measuring SRS is provided within a configuration of the first BWP;
    the first BWP is identified via a BWP-ID included in the configuration for measuring SRS; or
    a starting RB of the first BWP is included in the configuration for measuring SRS, and the first BWP is either:
        a BWP configured to the first UE for wireless communications; or
        a virtual BWP that is not configured to the first UE for wireless communications and one, multiple or all the other BWP configurations including BWP-ID and frequency bandwidth of the virtual BWP are not provided by network.

3. The method of claim 2, wherein, the frequency reference point is determined as either:
    a lowest subcarrier of the first BWP; or
    a lowest subcarrier of a common resource block of a serving cell for the first UE, depending on a value of a parameter indicating a shift in terms of a number of resource blocks (RBs) relative to a starting RB of the first BWP.

4. The method of claim 1, wherein, if the first BWP is not identified via a BWP-ID included in the configuration for measuring SRS or a starting RB of the first BWP is not included in the configuration for measuring SRS, the frequency reference point is determined as a lowest subcarrier of a common resource block of a serving cell for the first UE.

5. The method of claim 2, wherein the first UE considers the configuration as invalid if a frequency range of the determined SRS measurement resources exceeds a frequency bandwidth of the first BWP that is configured for wireless communications and is not a virtual BWP.

6. The method of claim 2, wherein the first UE considers the configuration as invalid if a subcarrier spacing (SCS) of the determined SRS measurement resources is different from an SCS of the first BWP that is configured for wireless communications and is not a virtual BWP.

7. The method of claim 1, wherein the UE is configured to only measure SRS measurement resources within the first BWP if the first BWP is configured for wireless communications and is not a virtual BWP.

8. The method of claim 1, wherein:
    the UE is configured with at least a second BWP for wireless communications that is not a virtual BWP; and
    the UE is configured to measure SRS measurement resources within a second BWP if one or more conditions are met.

9. The method of claim 8, wherein the one or more conditions comprise:
    frequency range of the SRS measurement resources is fully within the bandwidth of the second BWP; and
    the SRS measurement resources and the second BWPs have a same subcarrier spacing (SCS).

10. The method of claim 9, wherein the frequency reference point comprises:
    a starting resource block (RB) of the first BWP; or
    a lowest subcarrier of a common resource block of a serving cell for the first UE, depending on a value of a parameter indicating a shift in terms of a number of resource blocks (RBs) relative to a starting RB of the first BWP.

11. The method of claim 8, wherein the first UE considers the configuration as invalid if a frequency range of the determined SRS measurement resources exceeds a frequency bandwidth of both the first BWP, if the first BWP is configured for wireless communications and is not a virtual BWP, and the second BWP.

12. The method of claim 8, wherein the first UE considers the configuration as invalid if a subcarrier spacing (SCS) of the determined SRS measurement resources is different from an SCS of both the first BWP if the first BWP is configured for wireless communications and is not a virtual BWP and the second BWP.

13. A method for wireless communications by a first user equipment (UE), comprising:
    receiving a configuration of sounding reference signals (SRS) measurement resources for measuring SRS transmitted by a second UE;

determining a maximum number of SRS measurement resources supported by the first UE based on a UE capability; and measuring SRS transmitted by the second UE based on the configuration and the determined maximum number of SRS measurement resources supported by the first UE.

14. The method of claim 13, wherein the capability comprises at least one of:
   a standalone max number for SRS measurement resources; or
   a joint maximum number for SRS measurement resources together with at least one of channel state information reference signal (CSI-RS) or synchronization signal block (SSB) resources.

15. The method of claim 13, wherein:
   the UE counts a total number of ports across the configured resources against the maximum number of SRS measurement resources supported by the first UE; or
   the UE counts a total number of the configured resources against the maximum number of SRS measurement resources supported by the first UE.

16. The method of claim 13, further comprising, if an SRS measurement resource is configured but the UE is not required to measure the resource in a current active BWP, deciding whether or not to count that SRS measurement resource against the maximum number of SRS measurement resources supported by the first UE.

17. The method of claim 16, wherein the UE does not count that SRS resource against the maximum number of SRS measurement resources supported by the first UE.

18. A method for wireless communications by a network entity, comprising:
   sending, to a first user equipment (UE), a configuration for measuring sounding reference signals (SRS) transmitted by a second UE;
   configuring the UE with at least a first bandwidth part (BWP) associated with the configuration; and
   receiving, from the first UE, a report of SRS transmitted by the second UE on measurement resources determined based on a frequency reference point and one or more parameters of the configuration and the frequency reference point.

19. The method of claim 18, wherein:
   the configuration for measuring SRS is provided within a configuration of the first BWP;
   the first BWP is identified via a BWP-ID included in the configuration for measuring SRS; or
   a starting RB of the first BWP is included in the configuration for measuring SRS, and the first BWP is either:
      a BWP configured to the first UE for wireless communications; or
      a virtual BWP that is not configured to the first UE for wireless communications and one, multiple or all the other BWP configurations including BWP-ID and frequency bandwidth of the virtual BWP are not provided by the network entity.

20. The method of claim 19, wherein, the frequency reference point is determined as either:
   a lowest subcarrier of the first BWP; or
   a lowest subcarrier of a common resource block of a serving cell for the first UE, depending on a value of a parameter indicating a shift in terms of a number of resource blocks (RBs) relative to a starting RB of the first BWP.

21. The method of claim 18, wherein, if the first BWP is not identified via a BWP-ID included in the configuration for measuring SRS or a starting RB of the first BWP is not included in the configuration for measuring SRS, the frequency reference point is determined as a lowest subcarrier of a common resource block of a serving cell for the first UE.

22. The method of claim 18, wherein the UE is configured to only measure SRS measurement resources within the first BWP if the first BWP is configured for wireless communications and is not a virtual BWP.

23. The method of claim 18, wherein:
   the UE is configured with at least a second BWP for wireless communications and is not a virtual BWP; and
   the UE is configured to measure SRS measurement resources within a second BWP if one or more conditions are met.

24. The method of claim 23, wherein the one or more conditions comprise:
   frequency range of the SRS measurement resources is fully within the bandwidth of the second BWP; and
   the SRS measurement resources and the second BWPs have a same subcarrier spacing (SCS).

25. The method of claim 24, wherein the frequency reference point comprises:
   a starting resource block (RB) of the first BWP; or
   a lowest subcarrier of a common resource block of a serving cell for the first UE, depending on a value of a parameter indicating a shift in terms of a number of resource blocks (RBs) relative to a starting RB of the first BWP.

26. A method for wireless communications by a network entity, comprising:
   sending, to a first user equipment (UE), a configuration for measuring sounding reference signals (SRS) transmitted by a second UE;
   configuring the UE with at least a first bandwidth part (BWP) associated with the configuration; and
   receiving, from the first UE, a report of SRS transmitted by the second UE, subject to a maximum number of SRS measurement resources supported by the first UE based on a UE capability.

27. The method of claim 26, wherein the capability comprises at least one of:
   a standalone max number for SRS measurement resources; or
   a joint maximum number for SRS measurement resources together with at least one of channel state information reference signal (CSI-RS) or synchronization signal block (SSB) resources.

28. The method of claim 26, wherein:
   the UE counts a total number of ports across the configured resources against the maximum number of SRS measurement resources supported by the first UE; or
   the UE counts a total number of the configured resources against the maximum number of SRS measurement resources supported by the first UE.

29. The method of claim 26, further comprising, if an SRS measurement resource is configured but the UE is not required to measure the resource in a current active BWP, deciding whether or not the UE is to count that SRS measurement resource against the maximum number of SRS measurement resources supported by the first UE.

30. The method of claim 29, wherein the UE is not to count that SRS resource against the maximum number of SRS measurement resources supported by the first UE.

* * * * *